United States Patent [19]

Ismagilov et al.

[11] Patent Number: 4,886,649

[45] Date of Patent: Dec. 12, 1989

[54] METHOD FOR THE PURIFICATION OF HYDROGEN SULFIDE-CONTAINING GASES

[76] Inventors: Zinfer R Ismagilov, Tsvetnoi prospekt, 17, kv. 36; Kirill I. Zamaraev, ulitsa Zhemchuzhnaya, 2, kv. 13; Sergei R. Khairulin, Tsvetnoi prospekt, 27, kv. 47, all of Novosibirsk; Tofik G. Alkhazov, prospekt Kirova, 40, kv. 39, Baku; Foat R. Ismagilov, ulitsa Rabkorov, 26, kv. 42, Ufa; Alexei A. Ivanov, ulitsa Tereshkovoi, 38, kv. 21, Novosibirsk; Georgy B. Barannik, ulitsa Uritskogo, 37, kv. 56, Novosibirsk; Mikhail A. Kerzhentsev, ulitsa Polevaya, 14, kv. 128, Novosibirsk; Valentin V. Nemkov, ploschad Shaumiana, 5, kv. 8, Astrakhan; Valentin N. Parmon, ulitsa Tereshkovoi, 26, kv. 8, Novosibirsk, all of U.S.S.R.

[21] Appl. No.: 308,319

[22] Filed: Feb. 8, 1989

[30] Foreign Application Priority Data

Feb. 9, 1988 [SU] U.S.S.R. ............................... 4375327
Feb. 9, 1988 [SU] U.S.S.R. ............................... 4400744

[51] Int. Cl.$^4$ ..................... C01B 17/16; C01B 31/20
[52] U.S. Cl. ..................................... 423/230; 502/306
[58] Field of Search ........................ 423/230; 502/306

[56] References Cited

U.S. PATENT DOCUMENTS 4,519,992  5/1985  Alkhazob .......................... 423/230
4,690,806  9/1987  Schorfheide ....................... 423/230

Primary Examiner—Robert L. Stoll
Assistant Examiner—Lori S. Freeman
Attorney, Agent, or Firm—Ladas & Parry

[57] ABSTRACT

A starting hydrogen sulfide-containing gas is purified by way of a two-stage oxidation to elemental sulfur with oxygen which is supplied in an amount of 100–110% of the stoichiometric quantity necessary for oxidizing hydrogen sulfide to elemental sulfur. Oxidation at the first stage is carried out in a fluidized bed of a granular catalyst containing 10–20% by mass of magnesium chromite on aluminium oxide. At the second oxidation stage, the unreacted hydrogen sulfide and oxygen from the first stage are reacted at 140°–155° C. in the presence of a catalyst to form elemental sulfur.

The invention may be used in decontamination of natural gases high in hydrogen sulfide, gas releases of oil refinery and coke chemical plants.

4 Claims, No Drawings

METHOD FOR THE PURIFICATION OF HYDROGEN SULFIDE-CONTAINING GASES

FIELD OF THE ART

The invention relates to methods for the purification of hydrogen sulfide-containing gases.

The invention may be used in decontamination of natural gases with a high content of hydrogen sulfide, gas releases at oil refinery and coke chemical plants.

BACKGROUND OF THE INVENTION

Known in the art is a method for the purification of hydrocarbon gases from hydrogen sulfide comprising a heterogeneous-catalytic oxidation of hydrogen sulfide. The catalyst contains aluminium, iron, titanium and zinc oxides. Oxidation is carried out at 220°-260° C. (U.S. Pat. No. 4,519,992). The The method allows the degree of purification of a starting gas of 99.0-99.6% by mass to be achieved, but it is only suitable for the purification of gases having a hydrogen sulfide content of maximum 3% by vol.

Known in the art is a method for the purification of hydrogen sulfide-containing gases containing 4 to 25% by vol. of hydrogen sulfide (German Pat. No. 1,3332563). With this method, hydrogen sulfide-containing gases of such a concentration are subjected to oxidation on solid catalysts in the form of a mixture of nickel, titanium and aluminium oxides. Oxidation is carried out with oxygen used in an amount of 100% of the stoichiometric quantity according to the reaction $H_2S + \frac{1}{2}O_2 \rightarrow S + H_2O$. In carrying out oxidation on the abovementioned catalyst at 265° C., the starting gas is purified from hydrogen sulfide with the formation of elemental sulfur (sulfur yield amounts to 93.4%). Gaseous sulfur, water vapour and unreacted hydrogen-sulfide-containing gas are fed after oxidation to condensing of sulfur and water, whereafter hydrogen sulfide-containing gas containing about 0.11% by vol. of $H_2S$, 0.22% by vol. $SO_2$, 89.0% by vol. of $CO_2$, and 10.67% by vol. of $H_2O$ is subjected to reoxidation with sulfur dioxide to form elemental sulfur on a solid titanium-containing catalyst at 205° C. Finally, the overall degree of hydrogen sulfide recovery in the form of elemental sulfur amounts to 98%, the purified gas containing up to 1 g/nm$^3$ of pulverulent sulfur.

The prior art method is suitable for the purification of gases containing maximum 25% by volume of hydrogen sulfide. The use of gases with a higher concentration of hydrogen sulfide results in an increase in the adiabatic heating of the catalyst bed to cause an increase in the rate of reaction of sulfur dioxide formation (at a temperature above 350° C.); coking occurs (at a temperature above 500° C.) and cracking of hydrocarbon components takes place (if they are available in the starting gas). The degree of purification in using this method is 97.37% with the hydrogen sulfide content in the starting gas of 11% by vol., the purified gas containing about 2000 mg/nm$^3$ of hydrogen sulfide and 2000 mg/nm$^3$ of sulfur dioxide.

SUMMARY OF THE INVENTION

It is an object of the invention to provide a method for the purification of hydrogen sulfide-containing gases which ensures a deep purification of a starting gas having a high content of hydrogen sulfide.

This object is accomplished by that in a method for the purification of hydrogen sulfide-containing gases, comprising a heterogeneous-catalytic oxidation of hydrogen sulfide at two stages, with consecutive removal of elemental sulfur formed at each stage, according to the invention, oxidation is carried out with oxygen supplied to the first oxidation stage in an amount of 100-110% of the stoichiometric quantity necessary for oxidation of hydrogen sulfide to elemental sulfur, the oxidation at the first stage being carried out in a fluidized bed of a granular catalyst containing 10-20% by weight of magnesium chromite on aluminium oxide, the unreacted hydrogen sulfide and oxigen from the first stage being reacted at the second stage at 140°-155° C. to form elemental sulfur.

The method according to the invention allows purification of gases with a high content of hydrogen sulfide (30-50% by vol.) to be carried out with a high degree of purification —99%, the hydrogen sulfide content in the purified gas being of the order of 10-20 mg/nm$^3$. The method according to the invention is also suitable for the purification of gases containing up to 1% by mass of dust.

According to the invention, it is preferred that oxidation at the first stage be carried out at 250°-350° C. so as to allow catalyst efficiency to be maintained for a long time and a deep purification of the starting gas to be effected.

According to the invention, it is preferred that a catalyst used at the first oxidation stage be in the form of spherical granules so as to reduce mechanical wear of the catalyst and prolong service life of the spherical catalyst in comparison with a catalyst in the form of granules shaped, e.g. as rings or stubs.

According to the invention, in order to ensure a stable operation of the catalyst for a long time, it is preferred that granular catalyst with a strength of at least 165 kg/cm$^2$ be used.

Other objects and advantages of the invention will become apparent from the following detailed description of a method for the purification of hydrogen sulfide-containing gases that follows and examples of specific embodiments.

DETAILED DESCRIPTION OF THE INVENTION

The invention relates to the purification of such hydrogen sulfide-containing gases as high-sulfide natural gases including those released in blowing and testing gas wells (containing 30% by vol. of $H_2S$, 25-30% by vol. of $CO_2$, 30-35% by vol. of $CH_4$, 4-5% by vol. of $C_1$-$C_5$ hydrocarbons; 2-5% by vol. of moisture and/or dust); petroleum gases in oil deposits (containing 40-45% by vol. of $H_2S$, 20-25% by vol. of $CO_2$, 20-25% by vol. of $CH_4$, 5-7% by vol. of $C_1$-$C_5$ hydrocarbons, 2-5% by vol. of moisture); hydrorefining gases (containing 30-50% by vol. of $H_2S$, 15-20% by vol. of $CO_2$, 20-25% by vol. of $CH_4$, 6-7% by vol. of $C_1$-$C_5$ hydrocarbons, 2-5% by vol. of moisture); "acid" gases (containing 40-50% by vol. of $H_2S$, 40-50% by vol. of $CO_2$, 3-5% by vol. of $CH_4$, 1-2% by vol. of $C_1$-$C_5$ hydrocarbons, 2-5% by vol. of moisture).

A method for the purification of hydrogen sulfide-containing gases according to the invention is based on the heterogeneous-catalytical oxidation of hydrogen sulfide with oxygen. According to the invention, oxidation of a starting gas, which is carried out at two stages, is effected with oxygen which is supplied to the first stage of oxidation only in an amount of 100-110% of the stoichiometric quantity necessary for oxidation of hydrogen sulfide to elemental sulfur:

$$H_2S + \tfrac{1}{2}O_2 \rightarrow S + H_2O.$$

According to the invention, hydrogen sulfide in the starting gas is oxidized at the first stage of the method in a fluidized bed of a granular catalyst containing from 10.0 to 20.0% by mass of magnesium chromite deposited on aluminum oxide.

A carrier for the catalyst may be in the form of aluminium oxides in various forms ($\gamma$-$Al_2O_3$, $\alpha$-$Al_2O_3$, $\delta$-$Al_2O_3$, $\theta$-$Al_2O_3$).

A content of magnesium chromite (active source) in the catalyst below 10.0% by mass has been found incapable of ensuring the necessary rate of reaction of selective oxidation of hydrogen sulfide because of inadequate concentration of active catalytical centers on the surface of the aluminium oxide carrier.

Magnesium chromite content in the catalyst in excess of 20.0% by mass is inexpedient as activity of the catalyst increases but very insignificantly.

The abovementioned catalyst or catalysts of a similar type may be prepared by any appropriate known methods.

According to the invention, oxidation of a starting gas is carried out at the first stage in a fluidized bed of the abovementioned granular catalyst so as to ensure purification of gases with a high content of hydrogen sulfide (up to 50% by vol.) at two stages which has not been possible so far because of the formation of sulfur dioxides and trioxides in the reaction zone and also because of the formation of products of coking and cracking of hydrocarbon components of gases being purified. Maintaining the granular catalyst in the fluidized state allows temperature uniformity of the catalyst bed at any point thereof to be ensured. Therefore, oxidation of the starting gas at the first stage can be carried out under optimum temperature conditions so as to effectively remove heat by any appropriate known method (e.g. by means of coils or cooling jackets).

The starting gas can be oxidized at the first stage at a temperature of up to 380° C. It is, however, more expedient to maintain a temperature at a level of 250° to 350° C., whereby efficiency of the catalyst is retained for a prolonged period and a deeper purification is ensured. We have found that sulfur vapour is condensed at a temperature below 250° C. on the catalyst so as to lower the catalyst activity, and the reaction of homogeneous oxidation of hydrogen sulfide to sulfur dioxide occurs at a remarkable rate at a temperature above 350° C. The latter reaction impairs purification performance.

As oxidation of the starting gas at the first stage is carried out in a fluidized catalyst bed, the latter is to be at least 165 kg/cm² strong. Investigations showed that with the catalyst strength of 165 kg/cm² the rate of mechanical wear of the catalyst is 0.3% a day so that the catalyst must be in stable operation for hundreds of hours.

Granules of the catalyst may be in the form of, e.g. rings or stubs. The spherical shape of the granules is most preferred. The rate of mechanical wear of spherical granules in a fluidized bed is 20 times and even more as low as the rate of wear of granules of any other configuration, the other conditions being the same.

As mentioned above, the starting gas is oxidized with oxygen which is supplied to the first oxidation stage in an amount of 100–110% of the stoichiometric quantity necessary for oxidation of hydrogen sulfide to elemental sulfur. Experiments showed that if oxygen is supplied to the abovementioned granular catalyst bed in an amount below 100% of the stoichiometric quantity, a breakthrough of a part of hydrogen sulfide through the catalyst occurs, and if oxygen is supplied in excess of 110%, the rate of irreversible reaction of formation of sulfur dioxide, which is an undesired product of purification materially increases.

The first oxidation stage may be carried out in a conventional reactor which may be in the form of a vertical cylindrical vessel having a gas distribution grate in its bottom part. Diameter and height of the reactor are chosen in such a manner that the granular catalyst available in the reactor be put in the fluidized state when the design amount of a starting gas and oxygen are fed to the reactor.

After the first stage of purification of the starting gas under the conditions according to the invention, sulfur is formed at a rate of 2.3–3.2 g per 1 g of catalyst per hour, and a vapour and gas mixture formed as a result of oxidation contains mainly maximum 0.5% by vol. of hydrogen sulfide, 0.1–0.7% by vol. of oxygen, hydrocarbons, carbon dioxide, water and sulfur vapours, and liquid sulfur. After condensation of sulfur and water, the gas mixture containing maximum 0.5% by vol. of hydrogen sulfide and maximum 0.7% by vol. of oxygen, as well as hydrocarbons, carbon dioxide, and sulfur dust (up to 1.0% by mass) is supplied to a second catalyst bed for oxidation at the second stage.

A catalyst at the second oxidation stage may be in the form of known polycomponent deposited catalysts and also that used at the first oxidation stage or a catalyst containing titanium dioxide or vanadium pentoxide. The catalyst used at the second stage preferably has a specific surface area of 200–250 m²/g and an activity in hydrogen sulfide oxidation reaction of at least $5 \cdot 10^{-3}$ mmole/l·s at 155° C.

Oxidation at the second stage is carried out at 140°–155° C. Sulfur is known to have maximum flowability and minimum viscosity in the temperature range of 140° to 155° C. Oxidation in this temperature range makes it possible to remove sulfur formed as a result of the catalytic oxidation continually from the catalyst bed. In addition, this temperature range at the second oxidation stage ensures a high enough rate of oxidation of unreacted hydrogen sulfide from the first stage to elemental sulfur and trapping of pulverulent sulfur.

As a result of the first and second oxidation stages under the abovementioned conditions, a gas containing only 10–20 mg/nm³ of hydrogen sulfide can be produced. This gas can be used as fuel or it can be released into atmosphere without breaking the existing sanitary norms.

EXAMPLE 1

A starting gas containing $H_2S$-30.0 vol. %, $CO_2$-30 vol. %, $CH_4$-35 vol. %, $C_2$–$C_5$ hydrocarbons-5 vol. % was supplied at a rate of 5.0 l/h to a fluidized catalyst bed. Oxygen was also supplied to the catalyst bed at a rate of 100% of the stoichiometric quantity necessary for the reaction:

$$H_2S + \tfrac{1}{2}O_2 \rightarrow S + H_2O.$$

The amount of oxygen necessary for oxidation of hydrogen sulfide to elemental sulfur was calculated by the formula:

$$V_{O_2} = 0.5 \cdot V_r \cdot C / 100,$$

wherein $V_{O_2}$ is the amount of oxygen necessary for oxidation of hydrogen sulfide to elemental sulfur (1/h);
0.5 is the stoichiometric ratio of oxygen in the reaction
$H_2S + 0.5\ O_2 \rightarrow S + H_2O$;
$V_r$ is the amount of hydrogen sulfide-containing gas (1/h);
C is the concentration of hydrogen sulfide (vol. %).

The amount of oxygen supplied to the fluidized catalyst bed in this Example was 0.75 1/h. The fluidized bed consisted of spherical granules with the strength of 165 kg/cm$^2$ containing 10% by mass of $MgCrO_4$, $Al_2O_3$—the balance.

Purification of the starting gas was carried out at 250° C. and the flow rate of the starting gas and oxygen was 3600 h$^{-1}$. The degree of purification of the gas from $H_2S$ as a result of selective oxidation of hydrogen sulfide was 99% with the selectivity of 99%. The gas escaping from the fluidized catalyst bed containing unreacted hydrogen sulfide (up to 0.3% by vol.) and oxygen (up to 0.15% by vol.), carbon dioxide, $C_1$-$C_5$ hydrocarbons, water an sulfur vapours and liquid sulfur in an amount of up to 30% by mass was supplied to condensation for collecting liquid sulfur and water. The gas obtained after condensation contained: 0.3 vol. % of $H_2S$, 0.15 vol. % of $O_2$ as well as $CO_2$, $C_1$-$C_5$ hydrocarbons, pulverulent sulfur in an amount of up to 1.0% by mass. This gas was fed to another catalyst bed of $Al_2O_3 + V_2O_5$. Additional oxidation of hydrocarbon sulfide to elemental sulfur occurred in the second catalyst bed at 140° C., and pulverulent sulfur was trapped. The gas leaving the second catalyst bed contained 19.5 mg/nm$^3$ of hydrogen sulfide and pulverulent sulfur in an amount of 13 mg/nm$^3$. The purified gas could be used as vendible fuel gas or released into atmosphere.

Analysis of starting gaseous substances and oxidation reaction products was carried out in a parallel column chromatograph. Sorbents were in the form of NaX zeolite and porapack Q. Helium was used as carrier gas. The carrier gas flow was 30 ml/min. Working temperature of column sorbents was 20° C. for NaX zeolites and 140°–150° C. for porapack Q.

Content of pulverulent sulfur in the purified gas was determined as the difference between the weights of a three-ply cotton filter before and after the reaction.

Therefore, as a result of the oxidation process, a vendible fuel gas containing less than 20 mg/nm$^3$ of hydrogen sulfide and less than 20 mg/nm$^3$ of pulverulent sulfur was prepared as well as sulfur at a rate of 2.16 g per 1 g of catalyst per hour.

EXAMPLE 2

A starting gas containing: $H_2S$-40 vol. %, $CO_2$-30 vol. %, $C_1$-$C_5$ hydrocarbons-the balance was supplied at a rate of 5.0 1/h to a fluidized catalyst bed. Oxygen was also supplied at a rate of 1.0 1/h which amounted to 100% of the stoichiometric quantity. The supply rate of oxygen was calculated by the formula of Example 1. Composition and strength of the catalyst and oxidation conditions were the same as used in Example 1. The gas escaping from the fluidized catalyst bed contained 0.2 vol. % of $H_2S$, 0.1 vol. % of $O_2$ as well as $CO_2$, $C_1$-$C_5$ hydrocarbons, water, and sulfur vapours and 40% by mass of liquid sulfur. After condensation, a gas mixture containing 0.2 vol. % of $H_2S$, 0.1 vol. % of $CO_2$, $C_1$-$C_5$ hydrocarbons as well as pulverulent sulfur in an amount of 10% by mass were fed from the fluidized catalyst bed containing $Al_2O_3 + V_2O_5$ located downstream. Additional oxidation of hydrogen sulfide and pulvirulent sulfur trapping were carried out in the catalyst bed under the conditions similar to those described in Example 1.

Analysis of the gaseous substances and pulverulent sulfur was carried out as described in Example 1.

As a result of the catalytic oxidation, a fuel gas containing 18.0 mg/nm$^3$ of hydrogen sulfide and 14.0 mg/nm$^3$ of pulverulent sulfur was produced and sulfur in an amount of 2.7 g per 1 g of catalyst per hour.

EXAMPLE 3

A starting gas containing: $H_2S$-50 vol. %, $CO_2$-30 vol. %, $C_1$-$C_5$ hydrocarbons-the balance was supplied at a rate of 5.0 1/h to a fluidized catalyst bed. Oxygen was also supplied to the catalyst bed at a rate of 1.25 1/h which amounted to 100% of the stoichiometric quantity. The amount of oxygen was calculated by the formula of Example 1. Composition and strength of the catalyst and oxidation conditions were similar to those described in Example 1. Condensation and collection of liquid sulfur and moisture formed as a result of oxidation of hydrogen sulfide in the fluidized catalyst bed were carried out. The gas containing $H_2S$-0.28 vol. %, $O_2$-0.11 vol. %, carbon dioxide, $C_1$-$C_5$ hydrocarbons and pulverulent sulfur in an amount of 1% by mass from the fluidized catalyst bed were fed to a catalyst bed containing $Al_2O_3 + V_2O_5$ located downstream.

Additional oxidation of hydrogen sulfide to elemental sulfur and trapping of pulverulent sulfur occurred in the catalyst bed containing $Al_2O_3 + V_2O_5$ under the conditions described in Example 1.

Quantitative analysis of the gaseous substances and of pulverulent sulfur was carried out as described in Example 1.

As a result of the catalytic oxidation of the starting gas, a fuel gas containing 16 mg/nm$^3$ of hydrogen sulfide and 15 mg/nm$^3$ of pulverulent sulfur as well as sulfur in an amount of 3.35 g per 1 g of catalyst per hour were produced.

EXAMPLE 4

A starting "acid" gas containing: $H_2S$-50 vol. %, $CO_2$-50 vol. %, $C_1$-$C_5$ hydrocarbons-the balance was supplied at a rate of 5.0 1/h to a fluidized catalyst bed. At the same time, oxygen was supplied to the catalyst bed at a rate of 1.25 1/h which amounted to 100% of the stoichiometric quantity. The amount of oxygen was calculated by the formula of Example 1. Composition and strength of the catalyst and oxidation conditions were similar to those described in Example 1. Condensation and collection of sulfur and water formed as a result of the catalytic oxidation of hydrogen sulfide in the fluidized catalyst bed were carried out. Then the gas containing 0.22 vol. % of $H_2S$, 0.11 vol. % of $O_2$, carbon dioxide and pulverulent sulfur in an amount of 1.0% by mass from the fluidized catalyst bed were supplied to a catalyst bed containing $Al_2O_3 + V_2O_5$ located downstream. Additional oxidation of hydrogen sulfide to elemental sulfur and trapping of pulverulent sulfur were carried out in the catalyst bed containing $Al_2O_3 + V_2O_5$ under the conditions similar to those described in Example 1.

Quantitative analysis of the gaseous oxidation products and pulverulent sulfur was carried out as described in Example 1.

As a result of the catalytic oxidation of the starting gas, carbon dioxide ($CO_2$) was produced that contained 17.0 mg/nm$^3$ of hydrogen sulfide and 16.0 mg/nm$^3$ of pulverulent sulfur as well as sulfur in an amount of 3.35 g per 1 g of $MgCr_2O_4/Al_2O_3$ catalyst per hour.

EXAMPLE 5

A starting gas containing: $H_2S$-40 vol. %, $CO_2$-30 vol. %, $C_1$-$C_5$ saturated hydrocarbons-the balance was supplied at a rate of 5.0 l/h to a fluidized catalyst bed. At the same time, oxygen at a rate of 1.0 l/h was supplied to the catalyst bed which amounted to 100% of the stoichiometric quantity. The amount of oxygen was calculated by the formula of Example 1. The fluidized bed contained spherical granules of a catalyst with the strength of 165 kg/cm$^2$ that contained 20% by mass of $MgCr_2O_4$, $Al_2O_3$— the balance. Oxidation conditions in the fluidized catalyst bed were the same as in Example 1. Condensation and collection of water and liquid sulfur formed in the fluidized catalyst bed as a result of the reaction of oxidation of hydrogen sulfide to elemental sulfur were carried out and then the gas from the catalyst bed containing 0.22 vol. % of $H_2S$, 0.11 vol. % of $O_2$, $C_1$-$C_5$ hydrocarbons, carbon dioxide and pulverulent sulfur in an amount of up to 1.0% by mass were supplied to a catalyst bed containing $Al_2O_3 + V_2O_5$ located downstream. In this catalyst bed containing $Al_2O_3 + V_2O_5$ additional oxidation of hydrogen sulfide to elemental sulfur and trapping of pulverulent sulfur occurred.

Analysis of the product of the two-stage oxidation was similar to that described in Example 1.

As a result of the abovedescribed process, a fuel gas was produced containing 18.0 mg/nm$^3$ of hydrogen sulfide and 16.0 mg/nm$^3$ of pulverulent sulfur as well as 2.7 g of sulfur per 1 g of $MgCr_2O_4/Al_2O_3$ catalyst per hour.

EXAMPLE 6

A starting gas containing $H_2S$-40 vol. %, $CO_2$-30 vol. %, $C_1$-$C_5$ saturated hydrocarbons-the balance was supplied at a rate of 5.0 l/h to a fluidized catalyst bed. At the same time, oxygen was supplied to the catalyst bed at a rate of 1.1 l/h which amounted to 110% of the stoichiometric quantity. The amount of oxygen was calculated by the formula of Example 1. Composition and strength of the catalyst and oxidation conditions were the same as described in Example 1.

Condensation and collection of water and liquid sulfur formed in the fluidized catalyst bed as a result of reaction of selective oxidation of hydrogen sulfide were carried out. Then the gas from the fluidized catalyst bed containing 0.22 vol. % of $O_2$, $CO_2$, saturated $C_1$-$C_5$ hydrocarbons as well as pulverulent sulfur in an amount of up to 1% by mass were supplied to a catalyst bed containing $Al_2O_3 + V_2O_5$ located downstream. Additional oxidation of hydrogen sulfide to elemental sulfur and trapping of pulverulent sulfur occurred in this catalyst bed of $Al_2O_3 + V_2O_5$.

Analysis of the product of the two-stage oxidation was similar to that described in Example 1.

As a result of the abovedescribed processes, a fuel gas containing 17.0 mg/nm$^3$ of hydrogen sulfide and 15.0 mg/nm$^3$ of pulverulent sulfur as well as sulfur in an amount of 2.7 g per 1 g of $MgCr_2O_4/Al_2O_3$ catalyst per hour were produced.

EXAMPLE 7

A starting gas containing $H_2S$-40 vol. %, $CO_2$-30 vol. %, $C_1$-$C_5$ saturated hydrocarbons-the balance was supplied at a rate 5.0 l/h to a fluidized catalyst bed. At the same time oxygen was supplied to the fluidized catalyst bed at a rate of 1.05 l/h which amounted to 105% of the stoichiometric quantity. The amount of oxygen was calculated by the formula given in Example 1. Composition and strength of the catalyst and oxidation conditions were similar to those given in Example 1. Condensation and collection of water and liquid sulfur formed as a result of selective oxidation of hydrogen sulfide to elemental sulfur were carried out. Then the gas from the fluidized catalyst bed containing 0.22 vol. % of $H_2S$, 0.25 vol % of $O_2$, saturated $C_1$-$C_5$ hydrocarbons, traces of moisture, $CO_2$ and pulverulent sulfur in an amount of 1% by mass were supplied to a catalyst bed $Al_2O_3 + V_2O_5$ located downstream. Additional oxidation of hydrogen sulfide to elemental sulfur and trapping of pulverulent sulfur occurred in the catalyst bed of $Al_2O_3 + V_2O_5$.

Analysis of the product of the two-stage oxidation was similar to that described in Example 1.

As a result of the abovedescribed processes, a fuel gas containing 12.0 mg/nm$^3$ of hydrogen sulfide and 18.0 mg/nm$^3$ of pulverulent sulfur as well as sulfur in an amount of 2.7 g per 1 g of $MgCr_2O_4/Al_2O_3$ catalyst per hour were produced.

EXAMPLE 8

A starting gas containing 20.0 vol. % of $H_2S$, 30 vol. % of $CO_2$, $C_1$-$C_5$ saturated hydrocarbons-the balance was supplied at a rate of 5.0 l/h to a fluidized catalyst bed. At the same time oxygen was supplied to the fluidized catalyst bed at a rate of 1.05 l/h which amounted to 105% of the stoichiometric quantity. Oxygen amount in this and other Examples 9 through 19 was calculated by the formula of Example 1. The fluidized catalyst bed consisted of a catalyst in the form of spherical granules with the strength of 165 kg/cm$^2$. Composition of the catalyst: 15% by mass of $MgCr_2O_4$, $Al_2O_3$— the balance. Conditions of the catalytic oxidation of the starting gas in the fluidized bed were the same as in Example 1. Condensation and collection of water and liquid sulfur formed in the fluidized catalyst bed as a result of oxidation of hydrogen sulfide were carried out. Then the gas from the catalyst bed containing 0.26 vol. % of $H_2S$, 0.3 vol. % of $CO_2$, saturated hydrocarbons, moisture traces as well as pulverulent sulfur in an amount of 1% by mass were supplied to a catalyst bed containing $Al_2O_3 + V_2O_5$ located downstream. Additional oxidation of hydrogen sulfide to elemental sulfur and trapping of pulverulent sulfur occurred in the catalyst bed of $Al_2O_3 + V_2O_5$.

Analysis of the product of the two-stage oxidation was the same as that given in Example 1.

As a result of the abovedescribed processes, a fuel gas containing 15.0 mg/nm$^3$ of hydrogen sulfide and 19.0 mg/nm$^3$ of pulverulent sulfur as well as sulfur in an amount of 2.7 g per 1 g of $MgCr_2O_4/Al_2O_3$ catalyst per hour were produced.

EXAMPLE 9

A starting gas containing 40 vol. % of $H_2S$, 30 vol. % of $CO_2$, $C_1$–$C_5$ hydrocarbons-the balance was supplied at a rate of 5.0 1/h to a fluidized catalyst bed, and oxygen was supplied at the same time to the fluidized catalyst bed at a rate of 1.0 1/h which amounted to 100% of the stoichiometric quantity. The fluidized bed consisted of a catalyst in the form of spherical granules with the strength of 320 kg/cm$^2$ with the following composition: $MgCr_2O_4$ 15% by mass, $Al_2O_3$— the balance. Conditions of the catalytic oxidation of the starting gas in the fluidized bed were similar to those described in Example 8. Condensation and collection of water and liquid sulfur formed in the fluidized bed as a result of selective oxidation of hydrogen sulfide were carried out. Then the gas containing 0.3 vol. % of $H_2S$, 0.15 vol. % of $O_2$, $CO_2$, $C_1$–$C_5$ hydrocarbons, moisture traces as well as pulverulent sulfur in an amount of up to 1% by mass were supplied from the fluidized bed to a catalyst bed containing $Al_2O_3 + V_2O_5$ located downstream. Additional oxidation of hydrogen sulfide to elemental sulfur and trapping of pulverulent sulfur occurred in this catalyst bed containing $Al_2O_3 + V_2O_5$ under conditions similar to those described in Example 1.

In accordance with the analysis similar to that described in Example 1, the abovedescribed processes produced a fuel gas containing 15.0 mg/nm$^3$ of hydrogen sulfide and 19.0 mg/nm$^3$ of pulverulent sulfur as well as sulfur in an amount of 2.7 g per 1 g of $MgCr_2O_4$/$Al_2O_3$ catalyst per hour.

EXAMPLE 10

A starting gas containing 40 vol. % of $H_2S$, 30 vol. % of $CO_2$, $C_1$–$C_5$ hydrocarbons-the balance was supplied at a rate of 5.0 1/h to a fluidized catalyst bed. At the same time, oxygen was supplied to the fluidized catalyst bed at a rate of 1.05 1/h which amounted to 105% of the stoichiometric quantity. The fluidized bed consists of a catalyst in the form of spherical granules with the strength of 520 kg/cm$^2$ and a composition: $MgCr_2O_4$ 15% by mass, $Al_2O_3$— the balance. Then condensation and collection of water and liquid sulfur formed in the fluidized catalyst bed as a result of the reaction of selective oxidation of hydrogen sulfide were carried out. Then the gas containing 0.28 vol. % of $H_2S$, 0.34 vol. % of $O_2$, $CO_2$, $C_1$–$C_5$ hydrocarbons, traces of moisture and pulverulent sulfur in an amount of up to 1% by mass were supplied from the fluidized catalyst bed to a catalyst bed containing $Al_2O_3 + V_2O_5$ located downstream. Oxidation of hydrogen sulfide and trapping of pulverulent sulfur were carried out in this catalyst bed of $Al_2O_3 + V_2O_5$ under the conditions similar to those described in Example 1.

Analysis of products of the two-stage catalytic oxidation of the starting gas was carried out similarly to Example 1.

As a result of the two-stage catalytic oxidation, a fuel gas containing 16.0 mg/nm$^3$ of $H_2S$ and 13.0 mg/nm$^3$ of pulverulent sulfur as well as sulfur in an amount of 2.7 g per 1 g of $MgCr_2O_4$/$Al_2O_3$ catalyst per hour were produced.

EXAMPLE 11

A starting gas containing 40 vol. % of $H_2S$, 30 vol. % of $CO_2$, $C_1$–$C_5$ hydrocarbons was supplied at a rate of 5.0 1/h to a fluidized catalyst bed. At the same time oxygen was supplied to the fluidized catalyst bed at a rate of 1.10 1/h which amounted to 110% of the stoichiometric quantity. Composition and strength of the catalyst and conditions of oxidation of the starting gas in the fluidized catalyst bed were the same as in Example 9. Then condensation and collection of water and liquid sulfur formed in the fluidized catalyst bed as a result of the reaction of selective oxidation of hydrogen sulfide were carried out. A mixture containing 0.26 vol. % of $H_2S$, 0.65 vol. % of $O_2$, $CO_2$, $C_1$–$C_5$ hydrocarbons, moisture traces as well as pulverulent sulfur in an amount of up to 1% by mass was then fed from the fluidized catalyst bed to a catalyst bed containing $Al_2O_3 + V_2O_5$ located downstream.

Additional oxidation of hydrogen sulfide to elemental sulfur and trapping of pulverulent sulfur occurred in the catalyst bed of $Al_2O_3 + V_2O_5$.

Analysis of the products of the two-stage catalytic oxidation of the starting gas was carried out as described in Example 1.

As a result of the two-stage catalytic oxidation, a fuel gas containing 13.0 mg/nm$^3$ of $H_2S$ and 18.0 mg/nm$^3$ of pulverulent sulfur and sulfur in an amount of 2.7 g per 1 g of $MgCr_2O_4$/$Al_2O_3$ catalyst per hour were produced.

EXAMPLE 12

A starting gas containing 40 vol. % of $H_2S$, 30 vol. % of $CO_2$, $C_1$–$C_5$ hydrocarbons-the balance was supplied at a rate of 5.0 1/h to a fluidized catalyst bed.

At the same time oxygen was supplied to the fluidized catalyst bed at a rate of 1.05 1/h which amounted to 100% of the stoichiometric quantity. Composition and strength of the catalyst and conditions of catalytic oxidation in the fluidized bed were similar to those described in Example 1. Then condensation and collection of water and liquid sulfur formed in the fluidized catalyst bed as a result of the reaction of selective oxidation of hydrogen sulfide were carried out. The gas containing 0.24 vol. % of $H_2S$, 0.25 vol. % of $O_2$, $CO_2$, $C_1$–$C_5$ hydrocarbons, moisture traces as well as pulverulent sulfur in an amount of up to 1% by mass were then fed from the fluidized catalyst bed to a catalyst bed containing $Al_2O_3 + V_2O_5$ located downstream. Additional oxidation of hydrogen sulfide to elemental sulfur and trapping of pulverulent sulfur occurred in the catalyst bed of $Al_2O_3 + V_2O_5$ at 147° C.

Analysis of products of the two-stage catalytic oxidation of the starting gas was carried out as described in Example 1.

As a result of the two-stage oxidation, a fuel gas containing 15.0 mg/nm$^3$ of $H_2S$ and 16.0 mg/nm$^3$ of pulverulent sulfur as well as sulfur in an amount of 2.7 g per 1 g of $MgCr_2O_4$/$Al_2O_3$ catalyst per hour were produced.

EXAMPLE 13

A starting gas containing 40 vol. % $H_2S$, 30 vol. % of $CO_2$, $C_1$–$C_5$ hydrocarbons-the balance was supplied at a rate of 5.0 1/h to a fluidized catalyst bed. At the same time oxygen was supplied to the fluidized catalyst bed at a rate of 1.0 1/h which amounted to 100% of the stoichiometric quantity. Composition and strength of the catalyst and conditions of the catalytic oxidation in the fluidized catalyst bed were the same as in Example 1. Then condensation and collection of water and liquid sulfur formed in the fluidized catalyst bed as a result of reaction of selective oxidation of hydrogen sulfide were carried out. The gas containing 0.3 vol. % of $H_2S$, 0.15 vol. % of $O_2$, $CO_2$, $C_1$–$C_5$ hydrocarbons, moisture traces as well as pulverulent sulfur in an amount of 1% by mass were fed from fluidized catalyst bed to a catalyst bed containing 10% by mass of $MgCr_2O_4$, $Al_2O_3$— the balance, located downstream. Oxidation of hydrogen sulfide to elemental sulfur and trapping of pulverulent sulfur occurred in the bed of the $MgCr_2O_4/Al_2O_3$ catalyst under the conditions described in Example 12.

Analysis of the products of the two-stage catalytic oxidation of the starting gas was carried out a described in Example 1.

As a result of the two-stage oxidation, a fuel gas containing 18.0 mg/nm³ of $H_2S$ and 17.0 mg/nm³ of pulverulent sulfur as well as sulfur in an amount of 2.7 g per 1 g of $MgCr_2O_4/Al_2O_3$ catalyst per hour were produced.

EXAMPLE 14

A starting gas containing 40 vol. % of $H_2S$, 30 vol. % of $CO_2$, $C_1$-$C_5$ hydrocarbons-the balance was supplied at a rate of 5.0 l/h to a fluidized catalyst bed. At the same time, oxygen was supplied to the fluidized catalyst bed at a rate of 1.0 l/h which amounted to 100% of the stoichiometric quantity. Composition and strength of the catalyst were the same as in Example 1. Temperature of the fluidized catalyst bed was 300° C., gas flow rate was 3600 h$^{-1}$. Then condensation and collection of water and liquid sulfur formed in the fluidized catalyst bed as a result of reaction of selective oxidation of hydrogen sulfide were carried out. The gas containing 0.26 vol. % of $H_2S$, 0.13 vol. % of $O_2$, $CO_2$, $C_1$-$C_5$ hydrocarbons, moisture traces as well as pulverulent sulfur in an amount of 1% by mass were then fed from the fluidized catalyst bed to a catalyst bed containing $Al_2O_3+V_2O_5$ located downstream. Oxidation of hydrogen sulfide and trapping of pulverulent sulfur occurred in the catalyst bed containing $Al_2O_3+V_2O_5$ under the conditions described in Example 12.

Analysis of the products of the two-stage catalytic oxidation of the starting gas was carried out as described in Example 1.

As a result of the two-stage oxidation, a fuel gas containing 12.0 mg/nm³ of $H_2S$ and 19.0 mg/nm³ of pulverulent sulfur as well as sulfur in an amount of 2.7 g per 1 g of $MgCr_2O_4/Al_2O_3$ catalyst per hour were produced.

EXAMPLE 15

A starting gas containing 40 vol. % of $H_2S$, 30 vol. % of $CO_2$, $C_1$-$C_5$ hydrocarbons-the balance was supplied at a rate of 5.0 l/h to a fluidized catalyst bed. At the same time, oxygen was supplied to the fluidized catalyst bed at a rate of 1.0 l/h which amounted to 100% of the stoichiometric quantity. Composition and strength of the catalyst of the fluidized bed were the same described in Example 1. Temperature of the fluidized catalyst bed was 350° C. and the gas flow rate was 3600 h$^{-1}$. Then condensation and collection of water and liquid sulfur formed as a result of the reaction of selective oxidation of hydrogen sulfide were carried out. The gas containing 0.2 vol. % of $H_2S$, and 0.1 vol. % of $O_2$, $CO_2$, $C_1$-$C_5$ hydrocarbons and moisture traces as well as pulverulent sulfur in an amount of up to 1% by mass were then fed from the fluidized catalyst bed to a catalyst bed containing $Al_2O_3+V_2O_5$ located downstream. Oxidation of hydrogen sulfide to elemental sulfur and trapping of pulverulent sulfur occurred in the catalyst bed of $Al_2O_3+V_2O_5$ under the conditions described in Example 12.

Analysis of the products of the two-stage catalytic oxidation of the starting gas was carried out as described in Example 1.

As a result of the two-stage oxidation, a fuel gas containing 11.0 mg/nm³ of $H_2S$ and 13.0 mg/nm³ of pulverulent sulfur as well as 2.7 g of sulfur per 1 g of $MgCr_2O_4/Al_2O_3$ catalyst per hour were produced.

EXAMPLE 16

A starting gas containing 40 vol. % of $H_2S$, 30 vol. % of $CO_2$, $C_1$-$C_5$ hydrocarbons-the balance was supplied at a rate of 5.0 l/h to a fluidized catalyst bed. At the same time oxygen was supplied to the fluidized catalyst bed at a rate of 1.0 l/h which amounted to 100% of the stoichiometric quantity. Composition and strength of the catalyst were the same as in Example 1. Temperature of the catalyst bed was 220° C., the gas flow rate was 3600 h$^{-1}$. Then condensation and collection of water and liquid sulfur formed in the fluidized catalyst bed as a result of reaction of selective oxidation of hydrogen sulfide were carried out. The gas containing 0.44 vol. % of $H_2S$, 0.22 vol. % of $O_2$, $CO_2$, $C_1$-$C_5$ hydrocarbons as well as pulverulent sulfur in an amount of up to 1% by mass were then fed from the fluidized catalyst bed to a catalyst bed containing $Al_2O_3+V_2O_5$ located downstream. Oxidation of hydrogen sulfide to elemental sulfur and trapping of pulverulent sulfur occurred in the catalyst bed of $Al_2O_3+V_2O_5$ under the conditions described in Example 12.

Analysis of the products of the two-stage catalytic oxidation of the starting gas was carried out as described in Example 1.

As a result, a fuel gas containing 26.0 mg/nm³ of $H_2S$ and 18.0 mg/nm³ of pulverulent sulfur as well as sulfur in an amount of 2.7 g per 1 g of $MgCr_2O_4$ catalyst per hour were produced.

EXAMPLE 17

A starting gas containing 40 vol. % of $H_2S$, 30 vol. % of $CO_2$, $C_1$-$C_5$ hydrocarbons-the balance was supplied at a rate of 5.0 l/h to a fluidized catalyst bed. At the same time, oxygen was supplied to the fluidized catalyst bed at a rate of 1.0 l/h which amounted to 100% of the stoichiometric quantity. Composition and strength of the catalyst were similar to those described in Example 8. Temperature of the fluidized catalyst bed was 380° C., the gas flow rate was 3600 h$^{-1}$. Then condensation and collection of water and liquid sulfur formed in the fluidized catalyst bed as a result of reaction of selective oxidation of hydrogen sulfide were carried out. The gas containing 0.4 vol. % of $H_2S$, 0.2 vol. % of $SO_2$, $CO_2$, $C_1$-$C_5$ saturated hydrocarbons, moisture traces as well as pulverulent sulfur in an amount of up to 1% by mass were then fed from the fluidized catalyst bed to a catalyst bed containing $Al_2O_3+V_2O_5$ located downstream. Hydrogen sulfide reacted in the catalyst bed of $Al_2O_3+V_2O_5$ with sulfur dioxide under the conditions of Example 12 with the formation of elemental sulfur, and pulverulent sulfur was trapped.

Analysis of the products of the two-stage catalytic oxidation of the starting gas was carried out as described in Example 1.

As a result of the two-stage catalytic oxidation, a fuel gas containing 23.0 mg/nm³ of $H_2S$ and 12.0 mg/nm³ of $SO_2$ as well as 15.0 mg/nm³ of pulverulent sulfur and sulfur in an amount of 2.69 g per 1g of $MgCr_2O_4/Al_2O_3$ catalyst per hour were produced.

EXAMPLE 18

A starting gas containing 40 vol. % of $H_2S$, 30 vol. % of $CO_2$, saturated $C_1$-$C_5$ hydrocarbons-the balance was supplied at a rate of 5.0 l/h to a fluidized catalyst bed. At the same time oxygen was supplied to the fluidized catalyst bed at a rate of 1.0 l/h which amounted to 100% of the stoichiometric quantity. The fluidized catalyst bed consisted of stub-shaped granules; the catalyst strength was 320 kg/cm$^2$, composition: $MgCr_2O_4$ 20% by mass, $Al_2O_3$— the balance. Oxidation conditions in the fluidized bed were the same as described in Example 14.

Then condensation and collection of water and liquid sulfur formed in the fluidized catalyst bed as a result of selective oxidation of hydrogen sulfide were carried out. A gas containing 0.3 vol. % of $H_2S$, 0.15 vol. % of $O_2$, $CO_2$, $C_1$-$C_5$ saturated hydrocarbons, moisture traces as well as pulverulent sulfur in an amount of up to 1% by mass were then fed from the fluidized catalyst bed to a catalyst bed containing $Al_2O_3+V_2O_5$ located downstream. $H_2S$ was oxidized to elemental sulfur and pulverulent sulfur was trapped in the catalyst bed of $Al_2O_3+V_2O_5$.

Analysis of the products of the two-stage catalytic oxidation of the starting gas was carried out as described in Example 1.

As a result of the two-stage oxidation, a fuel gas containing 18.0 mg/nm$^3$ of $H_2S$ and 15.0 mg/nm$^3$ of pulverulent sulfur as well as sulfur in an amount of 2.7 g per 1 g of $MgCr_2O_4/Al_2O_3$ catalyst per hour were produced.

EXAMPLE 19

Composition of a starting gas, conditions for oxidation in a fluidized catalyst bed and the catalyst, composition of a gas fed from the fluidized catalyst bed to a second catalyst bed were the same as described in Example 9. Oxidation of hydrogen sulfide and trapping of elemental sulfur were carried out in a catalyst bed containing $Al_2O_3+TiO_2$ located downstream under the conditions described in Example 9.

Analysis of the products of the two-stage catalytic oxidation of the starting gas was carried out as described in Example 1.

As a result of the two-stage oxidation, a fuel gas containing 18.0 mg/nm$^3$ of $H_2S$ and 16.0 mg/nm$^3$ of pulverulent sulfur as well as sulfur in an amount of 2.7 g per 1 g of $MgCr_2O_4$ catalyst per hour were produced.

We claim:

1. A method for the purification of hydrogen sulfide-containing gases, comprising:

forming a first bed of a granular catalyst containing 10–20% of magnesium chromite on aluminium oxide;

supplying a starting hydrogen sulfide-containing gas and oxygen which is used in an amount of 100–110% of the stoichiometric quantity necessary for oxidizing hydrogen sulfide to elemental sulfur to said first catalyst bed with the formation of a fluidized bed of said catalyst;

oxidizing hydrogen sulfide of said starting gas to elemental sulfur in the fluidized bed of said catalyst to purify the gases and to form gaseous sulfur and water vapour;

removing from said first bed of said catalyst said resultant sulfur, water vapour and unreacted hydrogen sulfide-containing starting gas and oxygen;

condensing the resultant gaseous sulfur and water vapour removed from said catalyst bed;

forming another catalyst bed for oxidizing hydrogen sulfide to elemental sulfur;

supplying the unreacted starting hydrogen sulfide-containing gas, oxygen as well as non-condensed gaseous sulfur and water vapour removed from said first catalyst bed to said other catalyst bed;

oxidizing hydrogen sulfide of said starting gas to elemental sulfur in said other catalyst bed at 140°–155° C.

2. A method according to claim 1, wherein oxidation in said first catalyst bed is carried out at 250°–350° C.

3. A method according to claim 1, wherein said first catalyst bed is formed of spherical granules.

4. A method according to claim 1, wherein a granular catalyst of the first bed has a strength of at least 165 kg/cm$^2$.